United States Patent [19]
Matsumoto et al.

[11] Patent Number: 5,627,220
[45] Date of Patent: May 6, 1997

[54] PROCESS OF THE PREPARATION OF MODIFIED POLYISOCYANURATE FOAMS FOR HEAT INSULATION MATERIALS

[75] Inventors: Morihiro Matsumoto, Osaka; Noboru Yoshida, Nishinomiya; Kiyotake Morimoto, Koshigaya; Satoshi Nakamura, Tokyo, all of Japan

[73] Assignees: Daido Steel Sheet Corporation, Hyogo; Nisshinbo Industries, Inc., Tokyo, both of Japan

[21] Appl. No.: 493,409

[22] Filed: Jun. 22, 1995

[30] Foreign Application Priority Data

Dec. 7, 1994 [JP] Japan ............................ 6-304019

[51] Int. Cl.$^6$ ........................................ C08G 18/16
[52] U.S. Cl. ................ 521/108; 521/163; 521/177; 521/901; 521/902; 252/182.14; 252/182.26; 252/182.27
[58] Field of Search .................. 521/108, 901, 521/902, 163, 177; 252/182.14, 182.26, 182.27

[56] References Cited

U.S. PATENT DOCUMENTS

| | | | |
|---|---|---|---|
| 3,657,161 | 4/1972 | Bernard et al. | 521/108 |
| 3,894,972 | 7/1975 | Narayan et al. | 521/107 |
| 3,919,128 | 11/1975 | Baldino et al. | 260/2.5 |
| 3,922,238 | 11/1975 | Narayan | 521/177 |
| 3,928,256 | 12/1975 | Cenker et al. | 521/128 |
| 3,981,829 | 9/1976 | Cenker et al. | 521/107 |
| 3,994,837 | 11/1976 | Kan et al. | 521/159 |
| 3,994,893 | 11/1976 | Treuner | 424/248 |
| 3,998,766 | 12/1976 | Kan et al. | 521/127 |
| 4,040,992 | 8/1977 | Bechara et al. | 521/117 |
| 4,166,164 | 8/1979 | Cenker et al. | 521/129 |
| 5,126,305 | 6/1992 | Eling | 502/167 |
| 5,223,551 | 6/1993 | Gattuso et al. | 521/163 |
| 5,441,993 | 8/1995 | Maretti | 521/174 |

FOREIGN PATENT DOCUMENTS

| | | |
|---|---|---|
| 381324A1 | 8/1990 | European Pat. Off. . |
| 0381324 | 8/1990 | European Pat. Off. . |
| 0594181A3 | 4/1994 | European Pat. Off. . |
| 2272114A | 12/1975 | France . |

OTHER PUBLICATIONS

2464 Cellular Polymers, 12 (1993) No. 1, Shrewsbury, Shropshire, GB, "The Use of Secondary Aromatic Diamines in Rigid Isocyanurate–Based Foams", R.V. Scott et al.

*Primary Examiner*—Rachel Gorr
*Attorney, Agent, or Firm*—Nikaido Marmelstein Murray & Oram LLP

[57] ABSTRACT

A process of the preparation of the modified polyisocyanurate foams provided by a reaction of a polyisocyanate with a polyol composition mixture comprising a polyol, water, a trimerization catalyst, a carbodiimide catalyst, and an aromatic compound used as a chain extender. An amount of the aromatic compound used in the preparation is 0.5 to 10.0% by weight with respect to a total weight of the polyisocyanate and the polyol mixture.

11 Claims, 3 Drawing Sheets

PROCESS OF THE PREPARATION OF MODIFIED POLYISOCYANURATE FOAMS FOR HEAT INSULATION MATERIALS

BACKGROUND OF THE INVENTION

1. Field of the Invention

The present invention pertains to a process of the preparation of modified polyisocyanurate foams for heat insulation (hereinafter insulation) materials provided by reacting a polyisocyanate in the presence of a carbodiimide catalyst and a trimerization catalyst. More specifically, the present invention relates to the use of aromatic compounds that improve adhesion and compression strengths of the modified foams as well as their friability.

2. Description of the Prior Art

The preparation of modified polyisocyanurate foams containing isocyanurate (a trimer of isocyanate) and carbodiimide linkages is well known in the art as disclosed by U.S. Pat. No. 3,657,161. Further arts such as U.S. Pat. Nos. 3,894,972; 3,928,256; 3,981,829; 3,998,766; and 4,166,164 disclose other well known catalysts: (i) furfuryl alcohols and a tertiary amine trimerization catalyst, (ii) a co-catalyst system of tertiary aminoalcohols and a tertiary amine trimerization catalyst, (iii) a catalyst system comprising alkanol amino triazine, hexahydrotriazine, and phenol or substituted phenol, (iv) oxyalkylated Mannich polyols, and (v) $C_1$-$C_8$ alkali metal carboxylates as trimerization catalysts.

In general, the modified polyisocyanurate foams produced in these preparations have high friability and poor flame-retardancy for insulation materials. Thus phosphorous compounds containing active hydrogen have been employed to improve the flame-retardancy of the foams, as disclosed in U.S. Pat. No. 3,994,893. The use of toluene diisocyanate has been employed in order to improve the friability and flame-retardancy of the foams and is described in U.S. Pat. No. 3,994,837.

In the foregoing preparations, chlorofluorocarbons were used as blowing agents. However, due to the prohibited use of chlorofluorocarbons in the near future, processes of the preparation of the foams without the use of chlorofluorocarbons have been proposed in the arts, as disclosed by European Patent Publication EP 0381 324 A1 and U.S. Pat. No. 5,126,305. These arts describe the use of phospholene oxides as carbodiimide catalysts and water so as to form carbon dioxide as a blowing agent. Unfortunately, the employment of water brings urea linkages which are spread unevenly and cause coagulation or domain in the foams. Thus the foams provided by these processes were friable and possessed insufficient adhesion strength for insulation materials.

SUMMARY OF INVENTION

The present invention relates to the preparation of modified polyisocyanurate foams as insulation materials. Insulation panels made from the foams are often used as construction materials such as building walls and roofs of warehouses and factories. The panels are required to have low friability, high compression strength, excellent flame-retardancy, and, particularly, high adhesion to plates of the insulation panels.

A main object of the present invention involves the use of the aromatic compounds in addition to the conventional process. The aromatic compounds are used as chain extenders to form hard segments which are scattered at molecular level as firm branches in polymer chains of the foams. Therefore, the use of the aromatic compounds enables to improve not only adhesion but also compression strength and friability of the foams.

A foam reaction system contains a polyisocyanate and a polyol mixture comprising a trimerization catalyst, a carbodiimide catalyst, a polyol, water, and an aromatic compound. A suitable amount of the aromatic compound is 0.5 to 10.0% by weight, which is determined based upon a total amount of the polyol mixture and the isocyanate. An amount of water in the present invention is typically 0.5 to 1.5 wt. % based on the total weight of the reaction system. A foam reaction is obtained simply by adding the polyisocyanate to the polyol mixture and allowing the resulting mixture to foam.

A supplemental object of the present invention is to use a carbodiimide catalyst of phospholene oxide and water to produce carbon dioxide as a blowing agent, allowing no use of chlorofluorocarbons.

DESCRIPTION OF THE PREFERRED EMBODIMENTS

Figure 1:
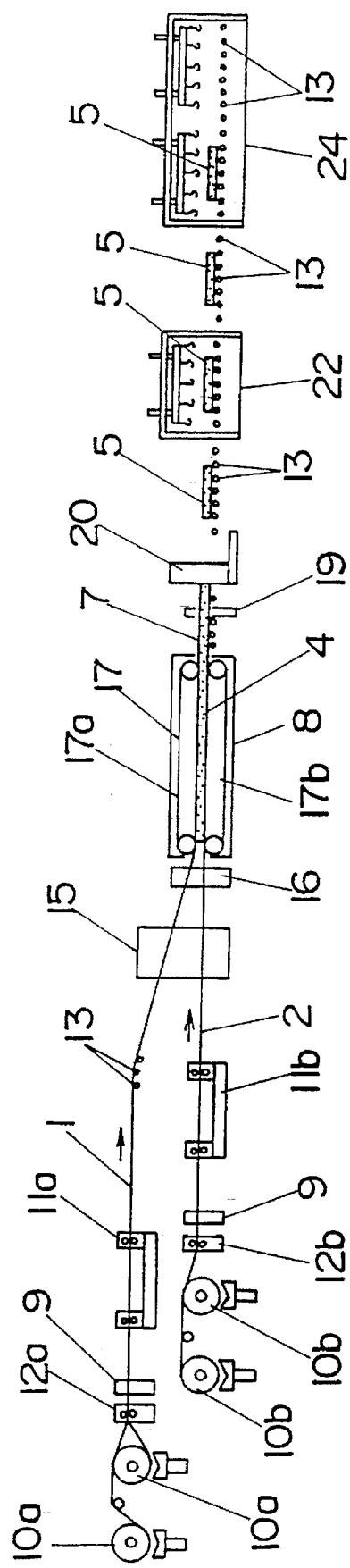
FIG. 1 is a cross sectional view of a mechanical system of manufacturing insulation panels from modified polyisocyanurate foams prepared in the present invention.

In accordance with the present invention, modified polyisocyanurate foams are provided by a reaction of a polyisocyanate in the presence of a polyol composition mixture comprising aromatic compounds, trimerization catalysts, carbodiimide catalysts, and water. The aromatic compounds are used as a chain extender, and the use of the compounds is essence to the present invention in order to improve adhesion strength, compression strength, and friability of the foams. The trimerization catalyst promotes the formation of isocyanurate linkages whereas the carbodiimide catalyst promotes the formation of carbodiimide linkages, associated with the evolution of carbon dioxide. Also, further carbon dioxide is formed by the reaction of the polyisocyanate with water. As mentioned previously, these carbon dioxides are used as a blowing agent in the preparation, thus there is no need to use environmentally unsafe chlorofluorocarbons.

Details of the starting materials listed above are described in the following.

Suitable polyisocyanates used in the present invention are aliphatic, alicyclic, and aromatic polyisocyanates. It may be possible to use polyisocyanates having a combination of these groups. It is also plausible to employ which ever polyisocyanates have been used in the preparations of polyurethanes and polyisocyanurates.

It is preferred to use aromatic diisocyanates such as 2,4-toluene diisocyanate (2,4-TDI), 2,6-toluene diisocyanate (2,6-TDI), crude toluene diisocyanate (crude-TDI), 4,4'-diphenyl methane diisocyanate (pure-MDI), and polymethylene polyphenyl polyisocyanate (crude-MDI); aromatic triisocyanates such as 4,4',4"-triphenyl methane triisocyanate and 2,4,6-toluene triisocyanate; aromatic tetraisocyanates such as 4,4'-dimethyl diphenyl methane-2,2'-5,5'-tetraisocyanate; aliphatic isocyanates such as hexamethylene-1,6-diisocyanate; alicyclic isocyanates such as hydromethylene diphenyldiisocyanate; and others such as m-phenylene diisocyanate, naphthalene-1,5-diisocyanate, 1-methoxyphenyl-2,4-diisocyanate, 4,4'-biphenyl diisocyanate, 3,3'-dimethoxyl-4,4'-biphenylene diisocyanate, and 3,3'-dimethyldiphenyl methane-4,4'-diisocyanate.

It is most preferred to use 2,4-TDI, 2,6-TDI, crude-TDI, pure-MDI, crude-MDI, hexamethylene-1,6-diisocyanate, and hydromethylene diphenyldiisocyanate.

Suitable polyols used in the present invention are selected from aliphatic, saccharide, and aromatic polyols; it is suitable to use polyols with a combination of these groups. Such polyols are polyether polyols, polyester polyols, caster oils, and the like. It is also suitable to use either high or low molecular weight polyols that are normally used for the preparation of polyurethanes.

The polyether polyols are prepared, for example, by the addition of alkylene oxide to active hydrogen containing compounds such as polyalcohols, polyphenols, and amines.

Suitable polyalcohols for the preparation of the polyether polyols are diols such as ethylene glycol, propylene glycol, 1,4-butadiol, 1,6-hexadiol, diethylene glycol, and n-pentylglycol; triols such as glycerin; and compounds with more than three hydroxyl groups such as: pentaerythritol, and sucrose.

Suitable polyphenols which are useful for the preparation of the polyether polyols are pyrogallol, hydroquinone, bisphenol A, and a condensation product of phenol and formaldehyde.

Suitable amines to be used for the preparation of the polyether polyols are ammonia; alcohol amines such as monoethanol amine, diethanol amine, triethanol amine, isopropanol amine, and amino ethyl ethanol amine; alkyl amines containing a $C_1$-$C_{22}$ alkyl group; aromatic amines such as diamines containing a $C_2$-$C_6$ alkylene group, polyalkylene amines, aniline, phenylene diamine, diamino toluene, xylene diamine, methylene dianiline, and diphenylether diamine; alicyclic amines such as isophorone diamine cyclohexylene diamine, and heterocyclic amines.

Suitable carboxylic acids for the preparation of the polyester polyols are alicyclic polycarboxylic acids such as succinic, adipic, sebacic, maleic, and dimer acids; and aromatic polycarboxylic acids such as phthalic, terephthalic, trimellitic, and pyromellitic acids.

More than two kinds of these active hydrogen containing compounds can be is used in the preparation of polyether polyols.

The alkylene oxide added to the active hydrogen containing compounds may be any one of propylene oxide, ethylene oxide, butylene oxide, and tetrahydrofuran. If more than two kinds of these alkylene oxides are used, they may be either block or random-added to the active hydrogen containing compounds.

Any suitable polyester polyols are used as polyols in the present invention, but it is preferred to use condensed polyester polyols prepared from polyalcohols (such as the diols listed above, trimethylol propane, and glycerin) and polycarboxylic acids (the ones listed above); polyester polypolyols prepared from the ring-opening polymerization of lactones; polyester polyols prepared from the addition of ethylene oxide adducts of nonyl phenol to scrap polyesters.

Most preferred polyols are aromatic, aliphatic, aromatic or aliphatic amine, pentaerythritol, or saccharide polyether polyols; aromatic or aliphatic carboxylic acid polyester polyols; and lactic polyester polyols.

The suitable and preferred polyols have their hydroxyl value ranges: generally, from 20 to 600 mg KOH/g; preferably, from 25 to 500 mg KOH/g; and, most preferably, from 50 to 400 mg KOH/g.

More than two kinds of these polyols may be used in the present invention.

Suitable aromatic compounds used in the present invention play an important role as chain extenders for the preparation of the modified polyisocyanurate foams. In the foam reaction, the aromatic compounds react with the polyisocyanate, resulting in the formation of hard segments in polymer chains of the foams. Cross linkers are often used to increase the cross linkage density of the foams, resulting in increases of compression and bending strengths, but also increasing friability and decreasing adhesion strength. On the other hand, the chain extenders improve not only the compression and bending strengths but also the friability and the adhesion.

The aromatic compounds are represented by the following formulae (I) and (II):

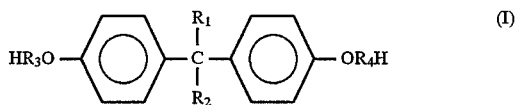

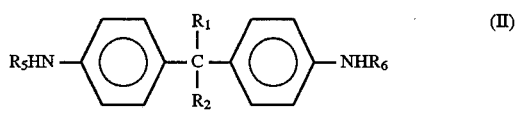

wherein $R_1$ and $R_2$ represent one of H and —$CH_3$, $R_3$ and $R_4$ represent one of the following ($\alpha$) and ($\beta$):

and

$R_5$ and $R_6$ represent $C_1$-$C_4$ alkyl groups, and n represents an integer from 1 to 4.

In particular, it is most preferred to use the following aromatic compounds represented by (I-a), (I-b), (I-c), and (II-a):

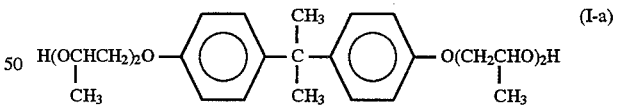

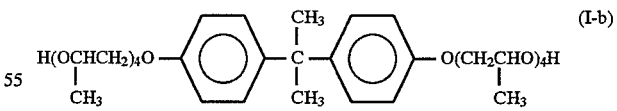

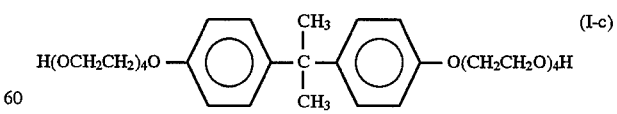

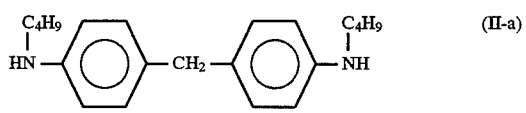

Suitable trimerization catalysts used are hydroxyl alkyl quaternary ammonium compounds which are normally used in the preparation of polyisocyanurate resins or polyurethane polyisocyanurate resins. These compounds are described in U.S. Pat. No. 4,040,992.

The trimerization catalysts in this invention are the following quaternary ammonium salts represented by the formula (V):

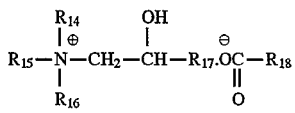

wherein $R_{14}$, $R_{15}$, and $R_{16}$ represent alkyl groups, $R_{17}$ and $R_{18}$ represent one of hydrogen and alkyl groups.

It is preferred to use quaternary ammonium compounds from (V-a) to (v-l):

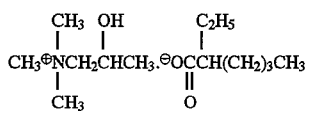 (V-a)

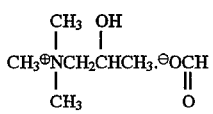 (V-b)

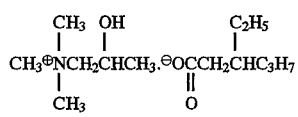 (V-c)

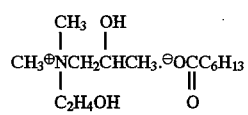 (V-d)

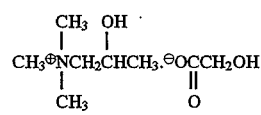 (V-e)

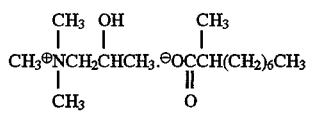 (V-f)

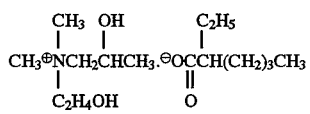 (V-g)

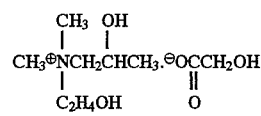 (V-h)

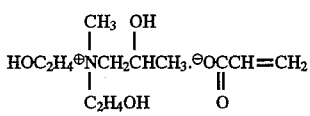 (V-i)

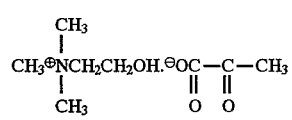 (V-j)

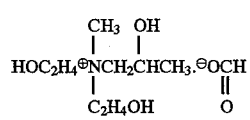 (V-k)

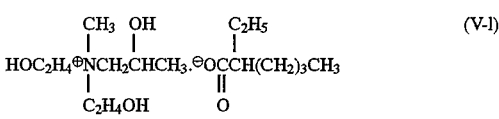 (V-l)

In particular, it is most preferred to use (V-a), (V-b), (V-k) and (V-l).

Other suitable trimerization catalysts are carboxylic acid salts such as potassium 2-ethyl hexanoic acid and sodium acetate; DBU (1,8-diazabicyclo [5,4,0]undencene-7) salts such as phenolic salts and acetic salts; tertiary amines such as 1,3,5-tris-(N,N-dimethyl amino propyl)-s-triazine, and 2,4,6-tris-(dimethyl amino methyl) phenol.

More than two kinds of the trimerization catalysts listed above may be used in the present invention.

Carbodiimide catalysts containing phospholene oxide are used in the present invention and disclosed in U.S. Pat. No. 3,657,161. As mentioned previously, the catalysts function as a promoter for the formation of carbodiimide linkages and a blowing agent to form a carbon dioxide in the foam reaction. An amount of water used in the preparation of the foams is reduced such that the negative effect of the urea linkages, causing high friability of the foams, is diminished. The use of the catalysts in the present invention results that the foams have low friability, sufficient compression and adhesion strengths.

It is preferred to use at least one of the following catalysts represented by the formulae (III) and (IV):

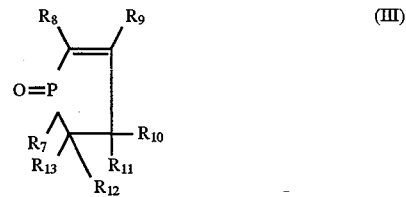 (III)

and

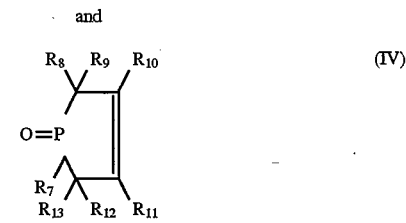 (IV)

wherein $R_7$ represents substituted or unsubstituted alkyl, phenyl, naphthyl, or benzyl groups; $R_8$, $R_9$, $R_{10}$, $R_{11}$, $R_{12}$, and $R_{13}$ represent hydrogen, chloride, or alkyl groups having a carbon number of 1 to 4.

Suitable substituted or unsubstituted alkyl groups for $R_7$ are of straight chains, branching chains, and these types substituted partially by halogen and other functional groups. Such groups are methyl, ethyl, propyl, isopropyl, n-butyl, t-butyl, 2-phenylethyl, 2-chloroethyl, and 2-methoxylethyl. It is possible to use substituted or unsubstituted phenyl, benzyl, and naphthyl groups such as o-, p-, or m-tolyl, xylyl, naphthyl, 4-diphenyl, o-, p-, or m-chlorophyneyl. Most suitable groups for $R_7$ are $C_1$-$C_4$ alkyl, phenyl, and benzyl. Suitable groups for $R_8$ to $R_{13}$ are hydrogen, chloride, methyl, ethyl, propyl, isopropyl, and butyl. Most suitable groups for $R_8$ to $R_{13}$ are hydrogen and methyl.

It is referred to use 1-methyl phospholene oxide, 3-methyl-1-phenyl phospholene oxide, 3-methyl-1-benzyl phospholene oxide, 3-methyl-1-ethyl phospholene oxide, 1-phenyl-3-(4-methyl-3-pentyl) phospholene oxide, and 1-phenyl-3-chlorophospholene oxide.

It is most preferred to use 3-methyl-1-phenyl-2-phospholene oxide and 3-methyl-1-phenyl-2-phospholene oxide. The foyer is represented by the formula (III-a), and the latter is represented by the formula (IV-a).

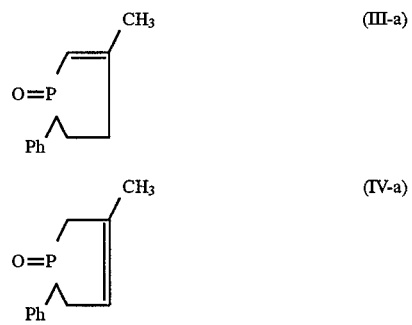

More than two kinds of these carbodiimide catalysts described above may be used in the present invention.

In the conventional process of the preparation of the modified foams, chlorofluorocarbons were used as blowing agents. However, chlorofluorocarbons are known to damage the ozone layer of the earth; thus, the use of chlorofluorocarbons tends to be totally prohibited in near future. In order to replace the use of chlorofluorocarbons in the preparation, it has been proposed to use a carbon dioxide which is obtained from the reaction of the polyisocyanate with water and the carbodiimide reaction (the formation of the carbodiimide linkages). In the former reaction, carbon dioxide is formed in the following chemical reaction: $2R—NCO + H_2O \rightarrow R—NHC(O)NH—R + CO_2$. As mentioned previously, by using the carbon dioxide as a blowing agent, the modified polyisocyanurate foams are prepared in this invention.

However, the urea linkages are formed in the reaction of water and the isocyanate. The linkages are distributed unevenly or ununiformly in the foams and cause coagulation or domain which makes the foams more friable and less compression. Thus there is a serious problem when the foams are used as insulation materials since they adhere to insulation plates improperly. It may be possible to increase an amount of water so as to reduce the rise density, but this reduction causes an increase of the urea linkages and makes the problem more serious.

Nevertheless, the use of the aromatic compounds in the present invention improves compression strength, friability, and adhesion strength of the foams. Therefore, the use of the aromatic compounds solves the problem and provides modified polyisocyanurate foams having excellent adhesion strength and high compression strength.

Depending upon necessary physical conditions of the foams, it is preferable to use additives such as: (i) urethane-urea catalysts such as triethylene diamine, dimethyl ethanol amine, triethyl amine, trimethyl aminoethyl ethanol amine, dimethyl amino ethylether, pentamethyl diethylene triamine, N-methyl morpholine, dibutyl tin dilaurate, tin octoate, and lead octoate; (ii) cross-linkers, excluding chain extenders, such as ethylene glycol, propylene glycol, 1,4-butadiol, 1,6-hexadiol, diethylene glycol, triethanol amine, diethanol amine, ethylene diamine, and toluene diamine; (iii) surfactants such as dimethyl siloxane polyether block copolymer; (iv) flame-retardants such as triphenyl phosphate, triethyl phosphate, trimethyl phosphate, cresyl diphenyl phosphate, tris cresyl phosphate, iris-(β-chloropropyl) phosphate, tris-(β-chloroethyl) phosphate, trischloroethyl phosphate, tris-dichloropropyl phosphate, tris-(2,3-dibromopropyl) phosphate, tris-(bromocresyl) phosphate, melamine, and antimony trioxide; and (v) others like coloring agents.

A polyol composition mixture comprising polyols, aromatic compounds, water, trimerization catalysts, and carbodiimide catalysts. These components of the mixture must be selected from the corresponding compounds described previously. It is preferred to add urethane-urea catalysts, surfactants, cross-linkers, flame-retardants, and coloring agents to the polyol composition.

A suitable amount of the aromatic compounds ranges from 0.5 to 10.0 wt. % against the total weight of the polyol composition (including the aromatic compounds) and the polyisocyanate used in the present invention. It is unrecommended to use amounts of the aromatic compounds outside of that range, i.e. less than 0.5 wt. % and greater than 10.0 wt. %. The former causes a decrease of the number of hard segments in polymer chains the foams; therefore, adhesion strength of the modified foam decreases considerably. The latter causes to increase the number of hard segments; consequently, the foam becomes friable.

A preferred amount of the trimerization catalysts ranges at from 0.1 to 10 wt. % based upon an amount of solely the polyisocyanate. It is most preferred to use the trimerization catalysts of 0.5 to 5 wt. %. On the other hand, it is preferred to use a range from 0.05 to 5 wt. % of the carbodiimide catalysts based upon the amount of the polyisocyanate. It is most preferred to use the carbodiimide catalysts of 0.1 to 2 wt. %. Furthermore, the relative weight percentage of the trimerization catalysts to the carbodiimide catalysts is preferred to be a range from 0.5 to 20 wt. % in the present invention. It is most preferred to use a range of 1 to 10 wt. %.

A suitable amount of water is within a range from 0.3% to 1.8 wt. % against the total weight of the polyol composition (including the water itself) and the polyisocyanate. It is most preferred to use an amount of water from 0.5% to 1.5wt. %. By using the suitable amount of water in the present invention, instead of the use of chlorofluorocarbons, it is possible to set a rise density of the modified foam to be less than 50 kg/m$^3$.

These amounts of the components of the polyol mixture can be changed as to various degrees of desired physical properties of the modified polyisocyanurate foams. But it is required that the isocyanate index, defined by the equivalent ratio of (NCO/OH), is greater than 1.8. In particular, it is preferred to use an isocyanate index range from 1.8 to 5.0 and most preferably from 2.0 to 4.0. In general, as the isocyanate index value increases, flame-retardancy of a polyisocyanurate foam increases.

A reaction system used in the present invention consists of the following two parts: (i) an isocyanate or an isocyanate prepolymer comprising an isocyanate and polyols; (ii) a polyol composition consisting of polyols, aromatic compounds, trimerization catalysts, carbodiimide catalysts, water, and additives such as urethane-urea catalysts, cross-linkers, surfactants, flame-retardants, and coloring agents. The parts (i) and (ii) are mixed vigorously at ambient temperature. The mixture may be heated up to 90° C. Suitable materials of plates are prepainted zinc plated steel, prepainted aluminum, prepainted aluminum-zinc alloy plated steel, stainless steel, titanium, and the like. It is possible to use plastics and papers as materials of the plates.

A modified polyisocyanurate foam is prepared by allowing the mixture to foam between the plates. Thus the insulation panels comprise the modified foam and the plates sandwiching the foam. Details of a continuous manufacturing method of the insulation panels are explained in the following.

Figure 3:
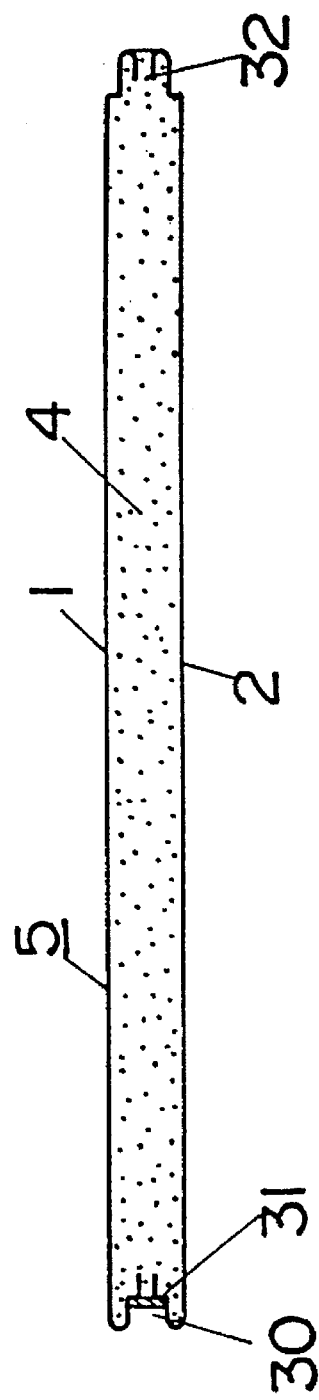
FIG. 3, composed of FIG. 3(a) and FIG. 3(b), illustrates a cross sectional view of an insulation panel comprising a male end, a female end, and a plastic foam sealant in FIG. 3(a); a cross sectional view of the insulation panel connected in series with other insulation panels in FIG. 3(b).
Figure 3:
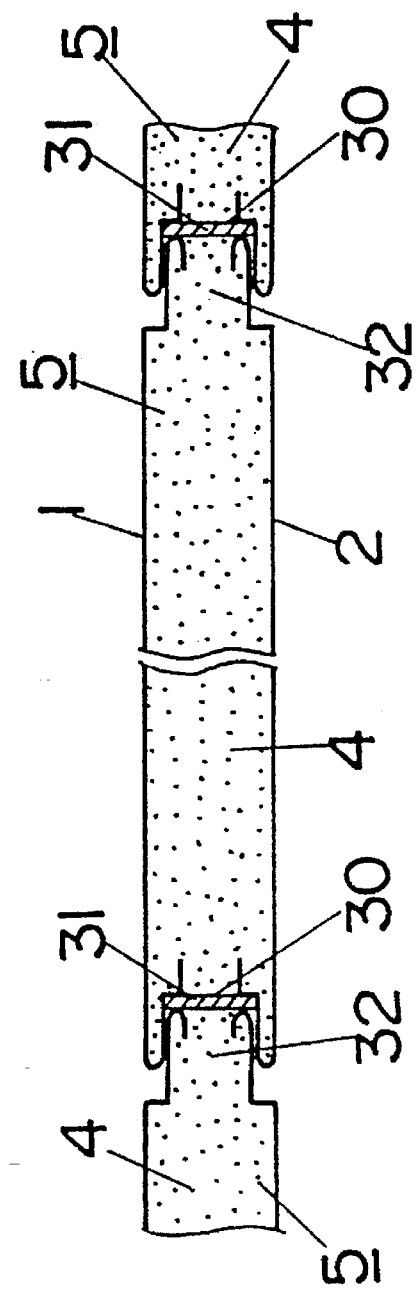

A simple machine for the manufacturing process is shown in FIG. 1; the figure is its cross sectional view. A top plate (1) is transported continuously by two pay-off reels (10a) and then by a pinch roller (12a) in FIG. 1. The top plate (1) goes through a shear (9) and reaches a profiling machine (11a). Similarly, a bottom plate (2) is transported continuously by two pay-off reels (10b) and then by a pinch roller (12b) in FIG. 1. The bottom plate (2) goes through another shear (9) and reaches a profiling machine (11b). At the profiling machine (11a), one end of the top plate (1) is roll-formed into a half part of a male end (32), as shown in FIG. 3(a); the other end is roll-formed into a half part of a female end (30), as shown in FIG. 3(a). Likewise, at the profiling machine (11b), one end of the bottom plate (2) is roll-formed into the other half of the male end (32); the other end is roll-formed into the other half of the female end (31). Surfaces of the plates may be roll-formed with various designs at the profiling machines (11a) and (11b). The top plate (1) is carried farther by a support roller (13). Both the top (1) and the bottom (2) plates meet at a pre-heater (15) to be heated at 30° to 80° C. and reach an oven (8).

An insulation mixture (4), containing all materials of the foam reaction system mentioned previously, is injected evenly from a spray nozzle (25), equipped in a coating gantry (16), at space between the plates. A typical spray density of the insulation material (4) is from 30 to 60 kg/m³. The gantry (16) can move forward and backward in order to spray the insulation material evenly between the plates. The space between the plates, equivalent of space between the vertical positions of the plates, is adjusted by conveyers (17a) and (17b) that are furnished in the oven (8) and move hydraulically upward and downward.

Figure 2:
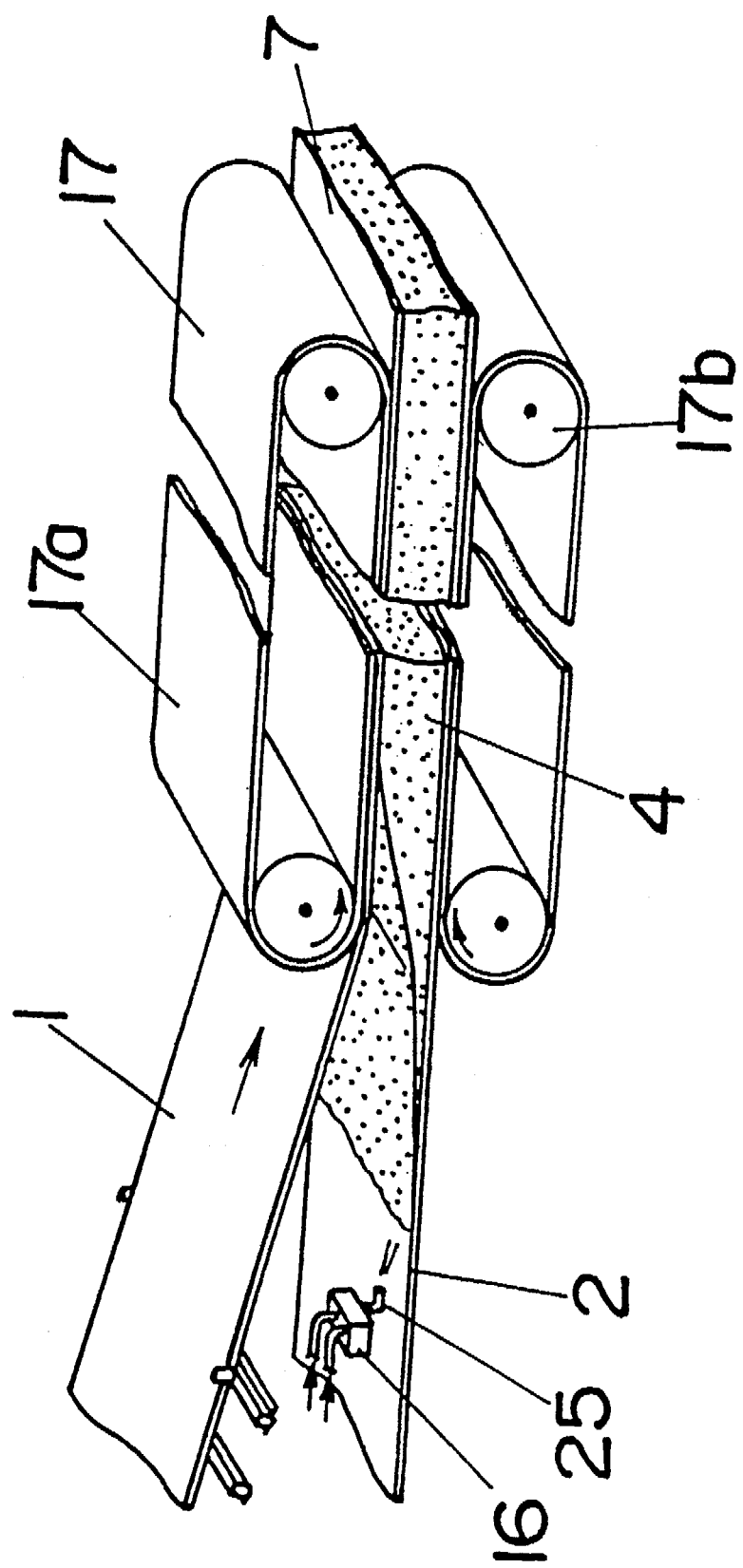
FIG. 2 is a perspective view of a coating gantry injecting a mixture of starting materials into the space between plates and double conveyers for adjusting the space.

FIG. 2 illustrates an enlarged figure of the coating gantry (16) and the conveyers (17a) and (17b) in the oven (8). The figure also illustrates that the insulation mixture (4) is sprayed from the spray nozzle (25) toward the space between the top (1) and the bottom (2) plates. A traveling speed of the plates through the oven (8) and A spraying speed of the nozzle (25) are adjusted in order to mass-produce the panels (7) efficiently. An original panel (7) consists of the insulation mixture (4) sprayed and the top (1) and bottom (2) plates sandwiching the insulation mixture (4).

Coming back to FIG. 1, the original panel (7) is transported farther and cut by a cutter (20) in order to make insulation panels (5) out of the original panel (7). The insulation panels (5) go though, first, a reject piler (22) that ejects defective samples out of a manufacturing line and, second, a main piler (24) that stacks the panels in units.

A cross sectional view of the insulation panel (5) is shown in FIG. 3(a). A cross sectional view of the insulation panels (5) is connected in series as shown in FIG. 3(b). A plastic foam sealant (31) is inserted at the end of the female end (30), and a piece of moisture preventive tape seals the top of the male end (32). The purpose of these sealing devices is to keep the insulation material (4) inside the panels (5).

It is possible to manufacture insulation panels in batches, instead of using the continuous manufacturing method described above, and insulation panels with only a top plate by using the techniques in the present invention.

EXAMPLES 1–4

Crude-MDI (modified diisocyanate), a polyisocyanate, was used in the present invention. The isocyanate was mixed with a polyol composition mixture comprising polyols, aromatic compounds, water, trimerization catalysts, carbodiimide catalysts, urethane-urea catalysts, surfactants, and flame-retardants. These components of the polyol mixture are selected from the corresponding compounds described previously. The admixture of the polyol mixture and the polyisocyanate was weighed exactly 150 g. The admixture was vigorously stirred with a mechanical drill (2200 rpm, with a 30 mm φ drill fin) for five seconds. Then a 120 g portion of the admixture was transferred into a wooden box 150×150×150 mm for free rise. Cream and rise times of a foam in the box were measured. The cream time is defined as length of time between when the portion is stirred and when it starts foaming. The rise time is defined as length of time between when the portion is stirred and when it ends foaming. Furthermore, the foam was trimmed such that the volume of the foam became 100×100×100 mm and weighed. A free rise density of the foam was calculated by dividing the weight of the foam by the volume of the foam.

Insulation panels of the modified polyisocyanurate foam were prepared in batches. First, two steel plates with thickness of 0.5 mm were supported to define a separated space in a 260×260×35 mm molding tray heated at 60° C. Second, a 120 g portion of the admixture was poured between the plates and allowed to foam. Third, the resulting insulation panel was cut into pieces of a size of 100×100×35 mm. The density of the foam was about 50 kg/m³.

Important physical properties of the foams are adhesion strength of the foam to steel plates, 10% compression strength, and friability. They were determined by: (i) JIS A 9514 for the standard of the adhesion strength, (ii) ASTM C 421 for the standard of the friability, and (iii) JIS K 6848 for the standard of the 10% compression strength, respectively.

An amount of the aromatic compound BA-P4 was increased from 1.0 wt. % to 10.0 wt. % in example 1–4. As a result, values of the adhesion strength and 10% compression strength of the foams were increased when the amount of the aromatic compound was increased. Values of the friability of the foams were also decreased. Thus all physical properties of the foams were improved by increasing the amount of the aromatic compound. No chlorofluorocarbon was used in the examples.

EXAMPLES 5–7

A series of modified polyisocyanurate foams was prepared by the same process explained previously except with the uses of different aromatic compounds: namely, BA-PS, BA-8, and UNILINK-4200.

The following TABLE I describes ingredients and amounts used in the preparations of the foams in examples 1–6 and values of the physical properties necessary to determine qualities of the foams.

The following list summarizes abbreviated compound names used in examples and comparative examples:

MR-200: a crude-MDI (product of Nippon Polyurethane Kogyo Sha)

PS-3152: a polyester polyol at the hydroxyl value of 315 (product of STEPAN Corporation).

PS-2352: a polyester polyol at the hydroxyl value of 235 (product of STEPAN Corporation).

TABLE I

| | EXAMPLES | | | | | |
|---|---|---|---|---|---|---|
| | 1 | 2 | 3 | 4 | 5 | 6 |
| Polyols (wt %) | | | | | | |
| PS-3152 | 14.0 | 12.0 | 10.5 | 6.5 | 11.5 | 11.0 |
| PS-2352 | | | | | | |

TABLE I-continued

| | EXAMPLES | | | | | |
|---|---|---|---|---|---|---|
| | 1 | 2 | 3 | 4 | 5 | 6 |
| Aromatic compounds (wt %) | | | | | | |
| BA-P4 | 1.0 | 3.0 | 5.0 | 10.0 | | |
| BA-P8 | | | | | 5.0 | |
| BA-8 | | | | | | 5.0 |
| UNILINK-4200 | | | | | | |
| water (wt %) | 0.7 | 0.7 | 0.7 | 0.7 | 0.7 | 0.7 |
| Trimerization catalysts (wt %) | | | | | | |
| DABCO TMR | 1.5 | 1.5 | 1.4 | 1.3 | 1.6 | 1.3 |
| DABCO K-15 | | | | | | |
| SA-NO. 1 | | | | | | |
| Carbodiimide catalysts (wt %) | | | | | | |
| 2-PMPO | 0.5 | 0.5 | 0.5 | 0.5 | 0.5 | 0.5 |
| 3-PMPO | | | | | | |
| Urethane-urea catalyst (wt %) | | | | | | |
| DMEA | 0.2 | 0.2 | 0.2 | 0.2 | 0.2 | 0.2 |
| Surfactant (wt %) | | | | | | |
| SH-193 | 1.0 | 1.0 | 1.0 | 1.0 | 1.0 | 1.0 |
| Flame-retardant (wt %) | | | | | | |
| FLROL-PCF | 3.0 | 3.0 | 3.0 | 3.0 | 3.0 | 3.0 |
| Polyol composition sum (wt %) | 21.9 | 21.9 | 22.3 | 23.2 | 23.5 | 22.7 |
| crude MDI (wt %) | 78.1 | 78.1 | 77.7 | 76.8 | 76.5 | 77.3 |
| Isocyanate index | 3.5 | 3.5 | 3.5 | 3.5 | 3.5 | 3.5 |
| Reactivities | | | | | | |
| Cream time (s) | 11 | 12 | 11 | 11 | 10 | 13 |
| Rise time (s) | 68 | 64 | 67 | 61 | 59 | 63 |
| Free rise density (kg/m$^3$) | 37 | 38 | 38 | 40 | 34 | 36 |
| 10% compression strength (kg/cm$^2$) | 1.6 | 1.7 | 1.9 | 2.1 | 1.7 | 1.9 |
| Adhesion strength (kg/cm$^2$) | 1.3 | 1.4 | 1.5 | 1.7 | 1.4 | 1.6 |
| Friability (%) | 48 | 37 | 31 | 28 | 30 | 25 |

NP-300: a polyether cross-linker at the hydroxyl value of 767 (product of Sanyokasei Kogyo Sha)
BA-P4: an aromatic compound represented by the formula (I-a) (product of Nippon Nyukazai Sha).
BA-P8: an aromatic compound represented by the formula (I-b) (product of Nippon Nyukazai Sha).
BA-8: an aromatic compound represented by the formula (I-c) (product of Nippon Nyukazai Sha).
UNILINK-4200: an aromatic compound represented by the formula (II-a) (product of UOP Corporation).
DABCO TMR: a trimerization catalyst represented by the formula (V-a) (product of Airproducts Corporation).
DABCO K-15: a trimerization catalyst of potassium 2-ethyl hexanoate (product of Airproducts Corporation).
SA-NO. 1: a trimerization catalyst of DBU (1,8-diazabicyclo [5,4,0]undencene-7) phenolic salt (product of Sanapro Corporation).
2-PMPO: a carbodiimide catalyst of 3-methyl-1-phenyl-2-phosphorous oxide.
3-PMPO: a carbodiimide catalyst of 3-methyl-1-phenyl-3-phosphorous oxide.
DMEA: a urethane-urea catalyst of dimethyl ethanol amine.
SH-193: a surfactant of dimethyl siloxane polyether block co-polymer (product of Toray-Dowcorning-Silicone Corporations).
FIROL-PCF; a flame-retardant of tris-($\beta$-chloropropyl) phosphate (product of Akzo-Kashima Corporations).
DEG; an aliphatic compound of diethylene glycol.
TEG: an aliphatic compound of triethylene glycol.
CFC-11: a chlorofluorocarbon of trichlorofluoro methane.

EXAMPLES 8-10

A series of modified polyisocyanurate foams was prepared by the same process explained previously except with the uses of various trimerization catalysts: namely, DABCO TMR, DABCO K-15 and SA-NO. 1.

EXAMPLES 11-12

Two more of modified polyisocyanurate foams were prepared by the same process explained previously except with the uses of various types, including isocyanates of low value index, of polyols: namely, PS-3152 and PS-2352. Comparing examples 2 and 11, a value of the friability of the example 11 foams decreased significantly as an amount of the polyol PS-3152 increased from 12.0% to 20.0 wt. %. Therefore, it follows that the increase in the polyol rate used improves the friability of the foam.

The following TABLE II describes ingredients and amounts used in examples 7–12, and values of the physical properties for the foams prepared in these examples.

Modified polyisocyanurate foams prepared in comparative examples 1–9 were provided by the same preparation process explained previously in examples 1–12 except that at least one component of the polyol mixture was either missing or changed. Each sum of ingredients in these comparative examples was also weighed exactly 150 g. Cream times, rise times, and free rise densities of the foams were measured by the same methods used in examples. And adhesion strengths, 10% compression strengths, and friabilities of the foams were measured by using the same standards in examples.

COMPARATIVE EXAMPLE 1

No carbodiimide catalyst was used in this comparative example. A free rise density of the resulting foam in this example was more than 50 kg/m$^3$, due to an insufficient amount of carbon dioxide. Thus the density of the foam was too high to manufacture polyisocyanurate insulation panels.

TABLE II

| | EXAMPLES | | | | | |
|---|---|---|---|---|---|---|
| | 7 | 8 | 9 | 10 | 11 | 12 |
| Polyols (wt %) | | | | | | |
| PS-3152 | 9.0 | 12.0 | 12.0 | 12.0 | 20.0 | |
| PS-2352 | | | | | | 15.0 |
| Aromatic compounds (wt %) | | | | | | |
| BA-P4 | | 3.0 | 3.0 | 3.0 | 3.0 | 3.0 |
| BA-P8 | | | | | | |
| BA-8 | | | | | | |
| UNILINK-4200 | 5.0 | | | | | |
| water (wt %) | 0.7 | 0.7 | 0.7 | 0.7 | 0.7 | 0.7 |
| Trimerization catalysts (wt %) | | | | | | |
| DABCO TMR | 1.3 | | | 1.5 | 1.3 | 1.6 |
| DABCO K-15 | | 1.7 | | | | |
| SA-NO. 1 | | | 1.4 | | | |

TABLE II-continued

| | EXAMPLES | | | | | |
|---|---|---|---|---|---|---|
| | 7 | 8 | 9 | 10 | 11 | 12 |
| Carbodiimide catalysts (wt %) | | | | | | |
| 2-PMPO | 0.5 | 0.5 | 0.5 | | 0.5 | 0.5 |
| 3-PMPO | | | | 0.5 | | |
| Urethane-urea catalyst (wt %) | | | | | | |
| DMEA | 0.2 | 0.2 | 0.2 | 0.2 | 0.3 | 0.2 |
| Surfactant (wt %) | | | | | | |
| SH-193 | 1.0 | 1.0 | 1.0 | 1.0 | 1.0 | 1.0 |
| Flame-retardant (wt %) | | | | | | |
| FLROL-PCF | 3.0 | 3.0 | 3.0 | 3.0 | 3.0 | 3.0 |
| Polyol composition sum (wt %) | 20.7 | 22.1 | 21.8 | 21.9 | 29.8 | 25.0 |
| crude MDI (wt %) | 79.3 | 77.9 | 78.2 | 78.1 | 70.2 | 75.0 |
| Isocyanate index | 3.5 | 3.5 | 3.5 | 3.5 | 2.5 | 3.5 |
| Reactivities | | | | | | |
| Cream time (s) | 12 | 12 | 12 | 10 | 11 | 12 |
| Rise time (s) | 61 | 62 | 65 | 60 | 58 | 61 |
| Free rise density (kg/m$^3$) | 36 | 37 | 40 | 36 | 38 | 38 |
| 10% compression strength (kg/cm$^2$) | 1.8 | 1.8 | 1.7 | 1.7 | 1.6 | 1.7 |
| Adhesion strength (kg/cm$^2$) | 1.6 | 1.3 | 1.3 | 1.6 | 1.2 | 1.6 |
| Friability (%) | 25 | 34 | 29 | 32 | 25 | 29 |

COMPARATIVE EXAMPLE 2

In this example also, no carbodiimide catalyst was used. Instead, an amount of water was increased from 0.7% to 1.2 wt. % in order to compensate an amount of carbon dioxide that the use of carbodiimide catalyst would have formed. However, significant urea linkages were formed in this preparation, resulting in an increase of coagulation in the foam. Comparing this product with the ones made in examples 1–12, the foam was extremely friable, the compression strength and adhesion strength of the foam were considerably reduced.

COMPARATIVE EXAMPLE 3

No aromatic compound was used in this comparative example. The resulting foam showed low compression strength and poor adhesion strength compared with those physical properties in examples 1–12. And the friability of the foam was also high.

COMPARATIVE EXAMPLE 4

No water was used in this example. Instead, an excess amount of carbodiimide catalyst was used to supply enough carbon dioxide in the foam reaction. Comparing this product with the products of examples 1–12, the resulting foam had insufficient compression strength and adhesion strength required for the insulation panels.

COMPARATIVE EXAMPLES 5-6

Aliphatic compounds, instead of the aromatic compounds, were used in these comparative examples. The foams prepared without the use of the aromatic compounds had insufficient compression strength and adhesion strength required for modified polyisocyanurate insulation panels. These comparative examples, together with comparative example 3, demonstrated importance of the use of the aromatic compounds in the present invention.

Table III sets forth ingredients and amounts used in comparative examples 1–6 and values of the physical properties for the foams prepared in these comparative examples.

COMPARATIVE EXAMPLES 7-8

Neither aromatic compound nor carbodiimide catalyst was used in these comparative examples. Comparing these results with the ones in examples 1–12, compression strengths and adhesion strengths of the foams in these comparative examples were significantly low. Consequently, the foams became more friable.

TABLE III

| | COMPARATIVE EXAMPLES | | | | | |
|---|---|---|---|---|---|---|
| | 1 | 2 | 3 | 4 | 5 | 6 |
| Polyols (wt %) | | | | | | |
| PS-3152 | 12.0 | 5.0 | 14.5 | 22.0 | 6.5 | 8.5 |
| Aromatic compound (wt %) | | | | | | |
| BA-P4 | 3.0 | 3.0 | | 3.0 | | |
| Aliphatic compound (wt %) | | | | | | |
| DEG | | | | | 3.0 | |
| TEG | | | | | | 3.0 |
| water | 0.7 | 1.2 | 0.7 | | 0.7 | 0.7 |
| Trimerization catalyst (wt %) | | | | | | |
| DABCO TMR | 1.5 | 1.7 | 1.5 | 1.5 | 1.5 | 1.6 |
| Carbodiimide catalyst (wt %) | | | | | | |
| 2-PMPO | | 0.5 | 1.8 | 0.5 | 0.5 | |
| Urethane-urea catalyst (wt %) | | | | | | |
| DMEA | 0.2 | 0.3 | 0.2 | 0.4 | 0.2 | 0.2 |
| Surfactant (wt %) | | | | | | |
| SH-193 | 1.0 | 1.0 | 1.0 | 1.0 | 1.0 | 1.0 |
| Flame-retardant (wt %) | | | | | | |
| FLROL-PCF | 3.0 | 3.0 | 3.0 | 3.0 | 3.0 | 3.0 |
| Polyol composition sum (wt %) | 21.4 | 15.2 | 21.5 | 32.7 | 16.4 | 18.5 |
| crude MDI (wt %) | 78.6 | 84.8 | 78.5 | 67.3 | 83.6 | 81.5 |
| Isocyanate index | 3.5 | 3.5 | 3.5 | 3.5 | 3.5 | 3.5 |
| Reactivities | | | | | | |
| Cream time (s) | 11 | 10 | 11 | 14 | 8 | 10 |
| Rise time (s) | 58 | 52 | 63 | 67 | 59 | 63 |
| Free rise density (kg/m$^3$) | 52 | 38 | 37 | 36 | 35 | 38 |
| 10% compression strength (kg/cm$^2$) | — | 1.3 | 1.0 | 0.7 | 0.7 | 0.6 |
| Adhesion strength (kg/cm$^2$) | — | 0.2 | 0.8 | 0.6 | 0.5 | 0.5 |
| Friability (%) | — | 85 | 58 | 44 | 56 | 58 |

It is clearly shown in these comparative examples that the presence of the urea linkages in the foams caused lower compression strength and lower adhesion strength of the foams even when the amount of water was increased to replace the carbon dioxide which was not formed due to the absence of carbodiimide catalysts.

COMPARATIVE EXAMPLE 9

In this comparative example, a chlorofluorocarbon was used as a blowing agent. As a result, the foam prepared without any chlorofluorocarbons in example 2 was similar in the physical properties to the foam prepared in this comparative example. Thus it follows that the example 2 foam was as good as the comparative example 9 foam.

The following TABLE IV lists ingredients and amounts used in comparative examples 7–9, and values of the physical properties for the foams prepared in these comparative examples.

TABLE IV

| | COMPARATIVE EXAMPLES | | |
|---|---|---|---|
| | 7 | 8 | 9 |
| Polyols (wt %) | | | |
| PS-3152 | 7.5 | | 17.0 |
| PS-2352 | | 9.0 | |
| NP-300 | | | 3.0 |
| Aromatic compound (wt %) | | | |
| BA-P4 | | | |
| Aliphatic compound (wt %) | | | |
| DEG | | | |
| TEG | | | |
| water (wt %) | 1.2 | 1.2 | 0.2 |
| Fluorocarbon (wt %) | | | 7.0 |
| CFC-11 | | | |
| Trimerization catalyst (wt %) | | | |
| DABCO TMR | 1.7 | 1.8 | 2.0 |
| Carbodiimide catalyst (wt %) | | | |
| 2-PMPO | | | |
| Urethane-urea catalyst (wt %) | | | |
| DMEA | 0.3 | 0.3 | 0.2 |
| Surfactant (wt %) | | | |
| SH-193 | 1.0 | 1.0 | 1.0 |
| Flame-retardant (wt %) | | | |
| FLROL-PCF | 3.0 | 3.0 | 3.0 |
| Polyol composition sum (wt %) | 14.7 | 16.3 | 23.4 |
| crude MDI (wt %) | 85.4 | 83.7 | 76.6 |
| Isocyanate index | 3.5 | 3.5 | 3.5 |
| Reactivities | | | |
| Cream time (s) | 9 | 11 | 12 |
| Rise time (s) | 54 | 61 | 57 |
| Free rise density (kg/m³) | 37 | 37 | 40 |
| 10% compression strength (kg/cm²) | 0.7 | 0.6 | 1.8 |
| Adhesion strength (kg/cm²) | 0.2 | 0.3 | 1.4 |
| Friability (%) | 89 | 88 | 28 |

What is claimed is:

1. A process of preparing a foam of modified polyisocyanurate comprising mixing a polyisocyanate, a polyol, and water in the presence of a first catalyst promoting the formation of isocyanurate linkages, and a second catalyst, comprising phospholene oxide, promoting the formation of carbodiimide linkages and the generation of carbon dioxide as a blowing agent, and an aromatic compound which is different from said polyol and is represented by at least one compound of the following formula (I) and (II):

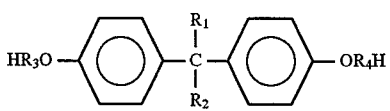

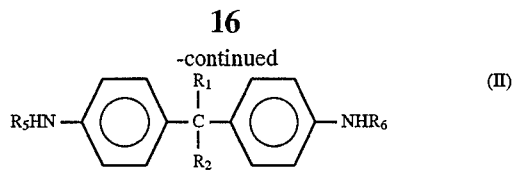

wherein $R_1$ and $R_2$ represents at least one of H and —$CH_3$, $R_3$ and $R_4$ represent at least one of the following ($\alpha$) and ($\beta$):

$$+CH_2CH_2O+_n \quad (\alpha)$$

and $$+CH_2CHO+_n, \quad (\beta)$$
$$\phantom{+CH_2}|$$
$$\phantom{+CH_2C}CH_3$$

$R_5$ and $R_6$ represent the same or different $C_1$-$C_4$ alkyl groups, and n represents an integer from 1 to 4; and reacting said mixture in the substantial absence of a chlorofluorohydrocarbon (CFC) blowing agent to form a foam with improved adhesion, improved compression strength and reduced friability and properties which are at least comparable to these characteristics in similar foams made with chlorofluorohydrocarbon blowing agents.

2. A process of preparing a foam of modified polyisocyanurate as set forth in claim 1, wherein said second catalyst is at least one compound represented by the following formulae (III) and (IV):

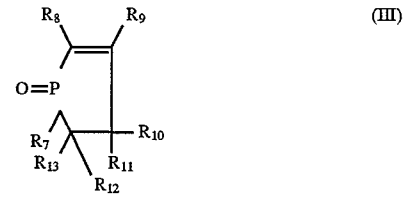

and

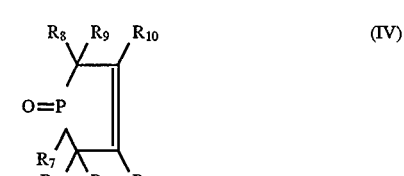

wherein $R_7$ represents substituted or unsubstituted alkyl, phenyl, naphthyl, or benzyl groups; and $R_8$, $R_9$, $R_{10}$, $R_{11}$, $R_{12}$ and $R_{13}$ are the same or different and represent hydrogen, chloride, or alkyl groups having a carbon number of 1 to 4.

3. A process of preparing a foam of modified polyisocyanurate as set forth in claim 1, wherein said aromatic compound is present in an amount of 0.5 to 10.0% by weight based upon a total amount of said aromatic compound, polyisocyanate, polyol, catalysts, and water.

4. A polyol composition, adapted to react with a polyisocyanate, which consists essentially of:

a polyol;
water;
an aromatic compound which is different from said polyol represented by at least one of the following formula (I) and (II):

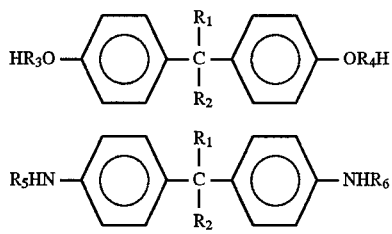

and

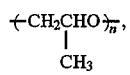

wherein $R_1$ and $R_2$ represent at least one of the following (α) and (β):

$\text{+CH}_2\text{CH}_2\text{O+}_n$      (α)

and $\text{+CH}_2\text{CHO+}_n$,      (β)
    |
   CH$_3$ $R_5$ and $R_6$ represent the same or different $C_1$-$C_4$ alkyl groups, and n represents an integer from 1 to 4:

a first catalyst for promoting the formulation of isocyanurate linkages; and a second catalyst of phospholene oxide for promoting the formation of carbodiimide linkages, wherein said second catalyst is at least one of those represented by the following formulae (III) and (IV):

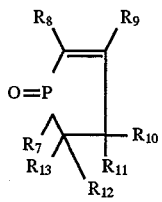

and

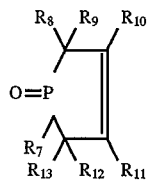

wherein $R_7$ represents the same or different substituted or unsubstituted alkyl, phenyl, naphthyl, or benzyl groups; and $R_8$, $R_9$, $R_{10}$, $R_{11}$, $R_{12}$, and $R_{13}$ represent the same or different hydrogen, chloride, or alkyl groups having a carbon number of 1 to 4.

5. A foam of modified polyisocyanurate obtained in accordance with a process as defined in claim 2.

6. The process as claimed in claim 1 wherein said polyol is an aliphatic polyol.

7. The process as claimed in claim 1 wherein said catalyst consists essentially of said trimerization forming catalyst and said phospholene oxide carbodiimide forming catalyst.

8. The product of the process of claim 1.

9. The process as claimed in claim 1 wherein said water is present in a proportion of about 0.5 to 1.5 weight percent based on the total weight of water, aromatic compound, polyol and polyisocyanate.

10. The polyol composition as claimed in claim 4 wherein said water is present in a proportion of about 0.5 to 1.5 weight percent based on the total weight of said water, aromatic compound, and polyol, and said polyisocyanate which is reactable with said polyol, water and said aromatic compound.

11. The product of the process of claim 9.

* * * * *